US012668079B2

(12) United States Patent
Schulte et al.

(10) Patent No.: US 12,668,079 B2
(45) Date of Patent: Jun. 30, 2026

(54) CASTOR BRAKE FOR DOUBLE SWIVEL CASTORS FOR CASES

(71) Applicant: RIMOWA GmbH, Cologne (DE)

(72) Inventors: Peter Schulte, Overath (DE);
Guillaume Vannier, Düsseldorf (DE);
Laurent Mas, Bergisch Gladbach (DE)

(73) Assignee: RIMOWA GmbH, Cologne (DE)

( * ) Notice: Subject to any disclaimer, the term of this patent is extended or adjusted under 35 U.S.C. 154(b) by 0 days.

(21) Appl. No.: 18/773,699

(22) Filed: Jul. 16, 2024

(65) Prior Publication Data

US 2025/0033409 A1 Jan. 30, 2025

(30) Foreign Application Priority Data

Jul. 28, 2023 (DE) ..................... 10 2023 120 149.2

(51) Int. Cl.
B60B 33/00 (2006.01)
(52) U.S. Cl.
CPC ...... B60B 33/0086 (2013.01); B60B 33/0042 (2013.01); B60B 33/0049 (2013.01);
(Continued)
(58) Field of Classification Search
CPC ... B60B 33/002; B60B 33/00; B60B 33/0028; B60B 33/0039; B60B 33/0047; B60B 33/0057; B60B 33/045; B60B 33/0063; B60B 33/0086; B60B 33/0042; B60B 9/06; B60B 9/005; B60B 2900/1331; B60B 33/0002; B60B 33/0049; B60B 33/0068; B60B 33/0073; B60B 33/0081; B60B 2200/20; B60B 2200/65; B60B 2360/00; B60B 2380/12; B60B 2900/571; B60B 2900/572; B60B 2900/112; B60B 2900/115; B60B 2900/321;
(Continued)

(56) References Cited

U.S. PATENT DOCUMENTS 2,878,899 A    3/1959   Kramcsak, Jr.
2,987,141 A    6/1961   Brooks
(Continued)

FOREIGN PATENT DOCUMENTS

DE       3913722 A1    3/1990
DE   202011050314 U1   10/2011
(Continued)

*Primary Examiner* — Chuck Y Mah
(74) *Attorney, Agent, or Firm* — Dickinson Wright PLLC

(57) ABSTRACT

A swivel castor, having a housing which can be pivoted into a rolling direction via pivot means and two wheels rotatably mounted on the housing on a horizontal wheel axle, wherein the pivot means are arranged in front of the wheel axle, contrary to the rolling direction, and having a braking device designed to be adjustable between a braking position, in which the braking device exerts a braking force on at least one wheel, and a free-rolling position, in which the braking device releases the wheels. A brake pedal generating the braking force is pivotably mounted on the housing via a pedal axle, which extends parallel to the wheel axle and arranged between the wheels, and, in the braking position, at least one brake shoe arranged on the brake pedal exerts a braking force parallel to the wheel axle directly on one side of at least one wheel.

16 Claims, 7 Drawing Sheets

(52) U.S. Cl.
CPC ...... *B60B 33/0057* (2013.01); *B60B 33/0068*
(2013.01); *B60B 33/0073* (2013.01); *B60B*
*2200/45* (2013.01); *B60B 2900/112* (2013.01);
*B60B 2900/115* (2013.01); *B60B 2900/321*
(2013.01); *B60B 2900/323* (2013.01); *B60B*
*2900/541* (2013.01)

(58) Field of Classification Search
CPC ........ B60B 2900/323; B60B 2900/541; B60G
11/00; B60G 11/14; B60G 11/15; B60G
11/16; B60G 11/006; B60G 3/01; A45C
5/14; A45C 2005/148
See application file for complete search history.

(56) References Cited

U.S. PATENT DOCUMENTS

| | | | | |
|---|---|---|---|---|
| 4,333,207 A | * | 6/1982 | Atwood .............. | B60B 33/0078 |
| | | | | 16/35 R |
| 5,566,788 A | * | 10/1996 | Smith ................. | B60B 33/0081 |
| | | | | 188/1.12 |
| 2011/0119864 A1 | * | 5/2011 | Minowa .............. | B60B 33/0092 |
| | | | | 16/45 |

FOREIGN PATENT DOCUMENTS

| | | | | | |
|---|---|---|---|---|---|
| DE | 202014100423 | U1 | | 5/2014 | |
| DE | 202013009346 | U1 | * | 1/2015 | ........... B60B 33/025 |
| ES | 1047165 | U | | 3/2001 | |
| JP | 2927345 | B2 | * | 7/1999 | |

* cited by examiner

11

14a

14

14

12

12a

12b

CASTOR BRAKE FOR DOUBLE SWIVEL CASTORS FOR CASES

CROSS REFERENCE TO RELATED APPLICATIONS

This application claims the benefit of priority under 35 U.S.C. § 119 to German Patent Application No. 10 2023 120 149.2, filed Jul. 28, 2023, the content of which is incorporated herein by reference in its entirety.

FIELD

The invention relates to a brakeable swivel castor. The invention also relates to a castor brake for double-swivel castors used with cases.

BACKGROUND

The statements in this section merely provide background information related to the present disclosure and several definitions for terms used in the present disclosure and may not constitute prior art.

Swivel castors have become accepted in the market as the preferred castor type for luggage items such as cases. In particular, steerable double castors are frequently used. Along with low costs, smooth rolling and durability, case castors are also particularly subject to requirements relating to shock absorption and noise generation. Moreover, the design of the castors and, in particular, the wheels, is important, in particular in the case of expensive cases. In addition, it is advantageous if wheels which are becoming worn are replaceable, which is effective in ensuring the proper functionality of the luggage item over a long useful life and counteracts any negative effects caused by worn wheels (for example negative noise generation, limited rolling properties or poorer haptics during the use of the luggage item). In particular, the very smooth rolling of high-quality case castors which has now been achieved raises the problem of the luggage item inadvertently rolling away, for example on inclined surfaces when standing in queues which are often encountered due to the barrier-free and disability-accessible design of airports and stations, or on public transport when buses or trains start or stop.

Depending on the friction coefficient of the castors and the floor surface, if the traction of the castors is insufficient, even commercially available case castors which are braked and fully locked may slip subject to the weight of the load in the case and the nature of the ground. On the other hand, it may be disadvantageous if the traction and braking force is so great that the cases tip over in excess of a certain movement force.

A brakeable swivel castor is described by way of example in DE 39 13 722 A1. The braking device is designed for a castor housing, which surrounds the two wheels laterally with two limbs in a fork-like manner. The braking device described therein for the swivel castor has a relatively complex design, wherein not only is the castor braked by a friction force here but, in addition, the rotational movement may also be blocked. The braking force is generated by a braking force directed radially onto the castors from above.

A further brakeable swivel castor is known from ES 1 047 165 U. The braking device is likewise designed for a castor housing which surrounds the two wheels laterally with two limbs in a fork-like manner. The braking device here has a brake pedal with a vertical dividing wall, which is arranged between the wheels and is in the form of a slightly inverted truncated cone. The brake pedal is pressed into holes formed in the limbs of the castor housing by means of two integrally formed cams. The dividing wall has a slight thickening, which limits its downward movement when it bears on the two wheels. In this swivel castor, a braking effect is achieved in that the dividing wall penetrates between the two wheels and presses them against the limbs of the castor housing, whereby the wheels are braked. In a design of this type, wear on the fastening and bearing of the brake pedal on the castor housing may appear relatively early since the fork-like castor housing, as well as the brake pedal itself, are regularly pressed apart during the actuation of the brake pedal. Moreover, in this embodiment, the brake device essentially acts in the upper part of the wheels so that the wheels are pressed apart at the top and therefore inevitably pressed together at the bottom. This results in a positive camber, which reduces the bearing surface of the wheels and therefore the grip on the floor. Moreover, the fork-like castor housing with the additionally fork-like brake pedal make it more difficult to replace the wheels.

In both castors of the conventional art as described above, the castor housing surrounds the wheels in a fork-like manner and, in this regard, conceals the design of the wheels, which is undesirable.

SUMMARY

An objective of the present disclosure is to provide an embodiment of a braked swivel castor, which is as simple as possible, can be produced in a cost-effective manner, achieves an effective and, at the same time, low-wear and durable braking effect and which moreover enables the wheels to be replaced as easily as possible.

According to one aspect of the present disclosure, the objective is achieved by a brakeable swivel castor having a castor housing which can be pivoted into a rolling direction (L) via pivot means and two wheels rotatably mounted on the castor housing on a horizontal wheel axle, wherein the pivot means are arranged in front of the wheel axle, as seen contrary to the rolling direction (L), and having a braking device, which is designed to be movable between a braking position, in which the braking device exerts a braking force on at least one wheel, and a free-rolling position, in which the braking device releases the wheels.

The braking device has a brake pedal for generating the braking force, which is pivotably mounted on the castor housing via a pedal axle which extends parallel to the wheel axle and is arranged between the wheels, and, in the free-rolling position and in the braking position, is held on the castor housing with form fit and force fit via latching means. In the braking position, at least one brake shoe arranged on the brake pedal exerts a braking force parallel to the wheel axle directly on one side of at least one wheel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
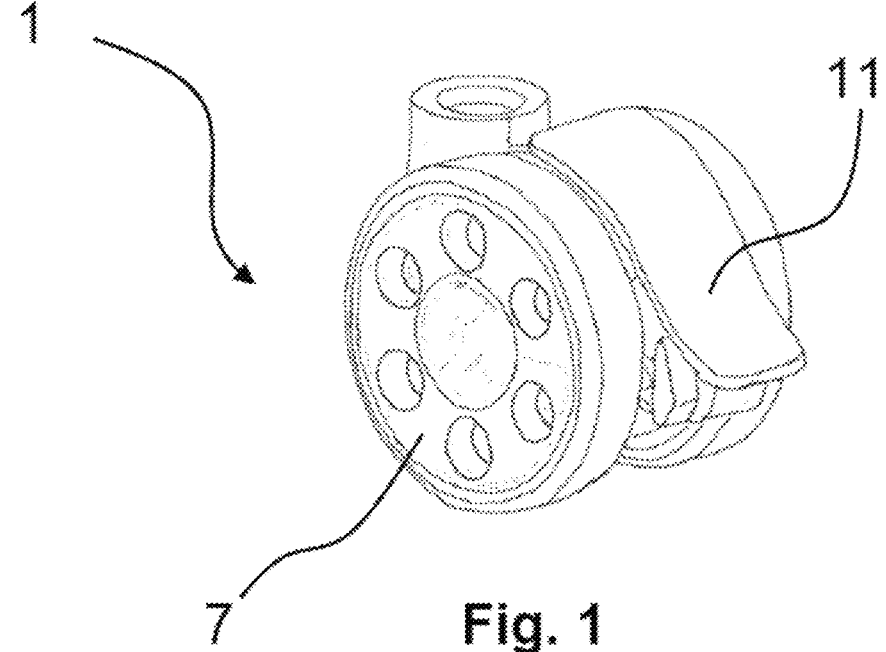
FIG. 1 shows a three-dimensional view of an embodiment of a brakeable swivel castor according to the teachings of the present disclosure

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

The present disclosure generally provides a brakeable swivel castor, having a castor housing which can be pivoted into a rolling direction via pivot means and two wheels rotatably mounted on the castor housing on a horizontal wheel axle, wherein the pivot means are arranged in front of the wheel axle, as seen contrary to the rolling direction, and having a braking device, which is designed to be movable between a braking position, in which the braking device exerts a braking force on at least one wheel, and a free-rolling position, in which the braking device releases the wheels.

This enables a very easily producible and, at the same time, stable and durable braking device. Moreover, the wheels can be easily replaced without having to release or remove the braking device. The wheels are moreover not concealed by the castor housing or the braking device, which means that an appropriate option in terms of the shape or the design of the wheels (in particular the front surface of the wheels, wheel hubs/caps) is enabled. Moreover, this enables a braking effect without total blocking of the castors. In the event that the downhill force on the case is greater than the retaining force of the brake, subject to the weight of the case and the forces acting on the case, this enables only a slow rolling away of the case whilst preventing the case from tipping over.

In an advantageous embodiment of the present disclosure, the pedal axle is arranged behind a vertical plane extending through the wheel axle, as seen contrary to the rolling direction. In particular, the brake shoes are arranged in such a way that their center points, as seen in the circumferential direction of the wheel, are located behind a vertical plane extending through the wheel axle, as seen contrary to the rolling direction L. This specific arrangement of the axles and brake shoes with respect to one another hinders or prevents the automatic release of the brake pedal upon a rotation of the wheels in the rolling direction.

Moreover, in the braking position, the braking device may press the wheels apart on the side facing away from the rolling direction and press them indirectly together on the side facing the rolling direction. This enables an additional braking effect since the wheels are positioned towards one another in the rolling direction. This produces a braking effect similar to the snow plough position when skiing. Moreover, such a positioning of the brake shoes reduces or prevents a positive or negative slip of the wheels in the braking position, which in turn enables as linear and extensive a contact area as possible between the wheels and the ground and therefore enables the greatest possible traction and a surface pressure which is distributed uniformly over the whole possible contact area/wheel width. As a result of the extensive contact area (even in the braking position), the distribution of the load of the case is ensured over the whole possible contact area of the wheels.

In a preferred embodiment, the castor housing and the brake pedal have cooperating latching means, which position the brake pedal in the braking position and in the free-rolling position with form fit and force fit under a defined retention force in each case. In particular, the latching means generate a haptic and/or acoustic feedback relating to the actuation of the brake pedal.

The brake pedal is particularly preferably designed as a two-component injection molded part, wherein a first component forms a fastening attachment for fastening the brake pedal on the castor housing and a second molded-on part forms the brake shoes. As a result of the reduction in the number of individual parts that this achieves, simple production and installation of the assembly is enabled. The brake pedal particularly preferably has a through-opening in the region of the brake shoes and the brake shoes are formed together as a single-part injection molded component with a material connection through the through-opening. This enables simple production of the brake shoes and a particularly stable design. It is particularly advantageous here if the brake shoes are made of a plastic material whereof the Shore hardness is greater, in particular up to 10 greater, preferably 5 greater, than the Shore hardness of a plastic material of the wheels. As a result, the wear generated by the friction force of the brake shoes will occur mainly on the lateral surfaces of the wheels, whereof the active surface is considerably greater than that of the brake shoe.

Further advantageous configurations of the present disclosure are revealed in more detail with reference to several embodiments illustrated in the following description of the figures. In the various figures of the drawing, the same parts are always denoted by the same reference signs.

With regard to the following description, it is claimed that the present disclosure is not restricted to the exemplary embodiments, nor to all or multiple features of described feature combinations; instead, each individual sub-feature of the/each exemplary embodiment also has significance for the subject matter of the present disclosure in isolation from all other sub-features described in association therewith and also in combination with any desired features of another exemplary embodiment.

Figure 2:
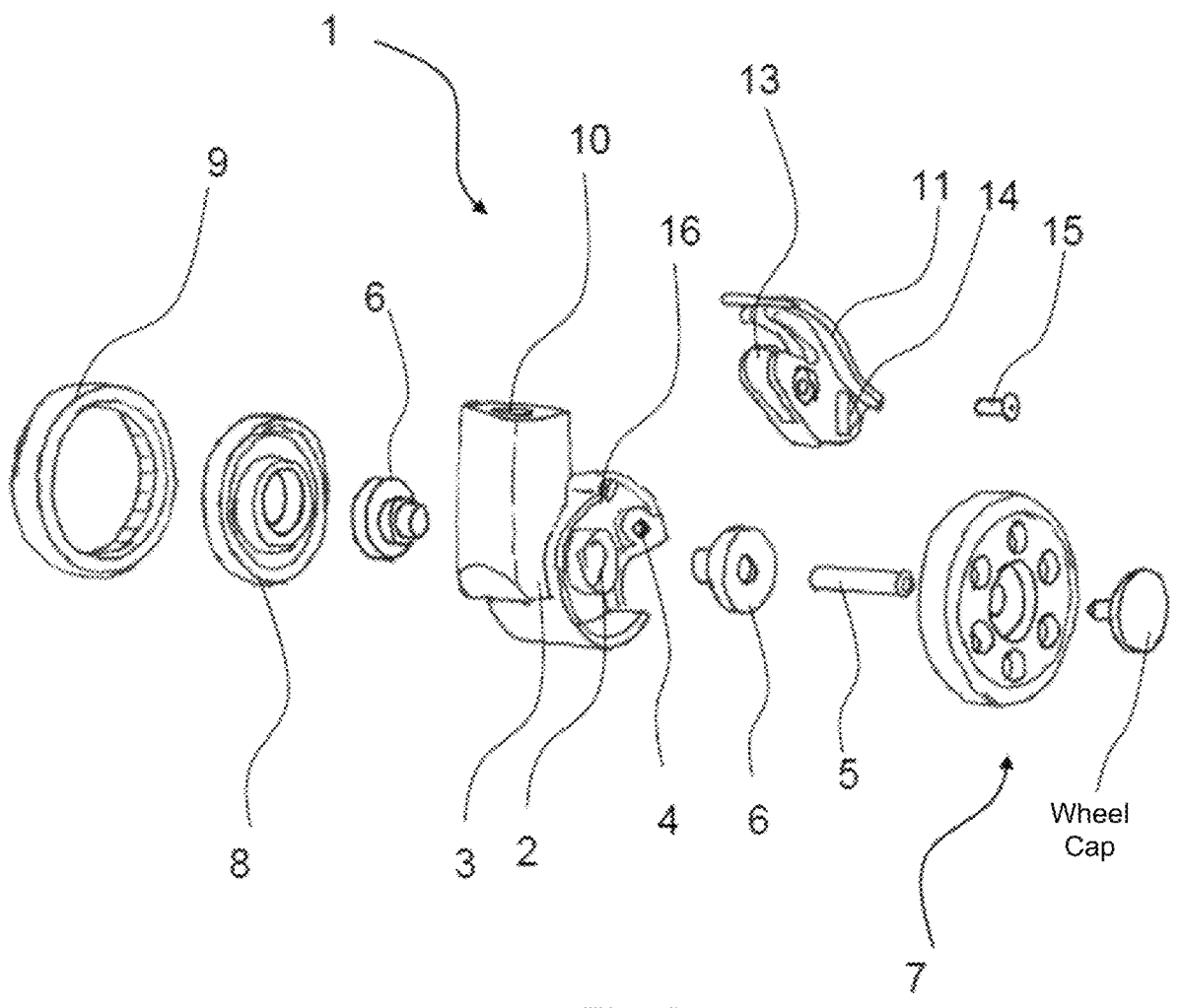
FIG. 2 shows an exploded illustration of the brakeable swivel castor according to FIG. 1.
Figure 3:
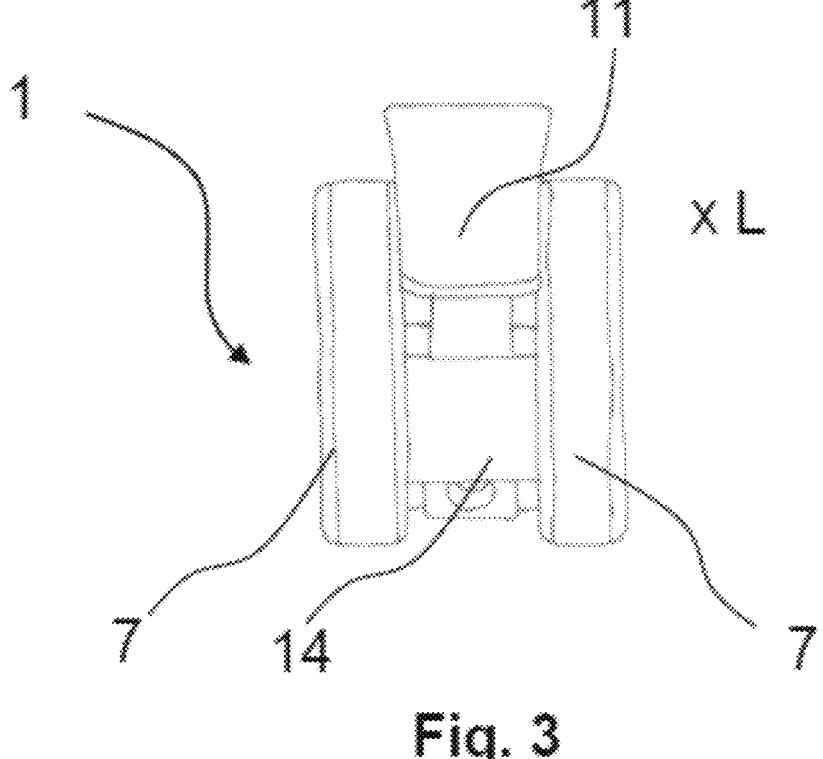
FIG. 3 shows a rear view of the brakeable swivel castor according to FIG. 1 in a rolling direction.

FIG. 1 shows a three-dimensional view of an exemplary embodiment of a brakeable swivel castor 1 according to the teachings of the present disclosure. FIG. 2 shows an exploded drawing of this embodiment, in which the individual parts of the brakeable swivel castor 1 according to the present disclosure can be seen. FIG. 3 shows a rear view in the rolling direction L.

The swivel castor 1 has a castor housing 3. The castor housing 3 comprises, in particular, a receiving opening 2 for receiving at least one wheel bearing 6. A horizontally extending wheel axle 5 is rotatably mounted in the castor housing 3 by means of the wheel bearing 6. A respective wheel 7 is fastened on two outer sides of the castor housing 3 via the wheel axle 5. In particular, the wheels 7 may be fastened on the wheel axle 5 via a rivet, screw or latching connection.

The wheels 7 have, in particular, a rim 8 and a tread 9 applied to the rim 8. The tread 9 is preferably made from TPU material. The wheel 7 advantageously has a wheel cap fastened laterally on the rim 8.

So that the swivel castor 1 is automatically aligned in a rolling direction L during a movement, the castor housing 3 has pivot means 10 arranged offset from the wheel axle 5. The pivot means 10 are arranged in front of the wheel axle 5, as seen contrary to the rolling direction L. The pivot means 10 preferably comprise a vertical receiving bore in the castor housing 3, in which a pivot axle (not illustrated) is rotatably mounted and via which the castor housing 3 can be fastened on a case.

A horizontally extending through-opening 4 for fastening a braking device is moreover preferably formed on the caster housing 3. The braking device is designed to be movable between a braking position, in which the braking device exerts a braking force on at least one wheel 7, and a free-rolling position, in which the braking device releases the wheels 7.

According to another aspect of the present disclosure, provision is made for a brake pedal 11 for generating the braking force to be pivotably mounted on the castor housing 3 via a pedal axle 15 which extends parallel to the wheel axle 5 and is arranged between the wheels 7. To this end, the brake pedal 11 has, in particular, a fork-shaped fastening attachment 13, which surrounds the castor housing 3 laterally with two limbs between the wheels 7. In particular, the limbs of the fastening attachment 13 have a respective horizontal through-bore, which are designed to be flush with the through-opening 4 of the castor 3 and through which the pedal axle 15 for fastening the brake pedal 11 on the castor housing 3 is pushed. The pedal axle 15 may be designed, in particular, as a rivet connection.

Moreover, the brake pedal 11 has, in particular in the radially outer region of the swivel castor 1, a preferably wave-shaped curved actuating surface, via which the brake pedal 11 may be moved from the free-rolling position to the braking position using the front of the foot.

The brake pedal 11 is advantageously ergonomically formed in such a way that, due to the force effect on a bottom first foot-application area, the brake pedal 11 may be retracted into the swivel castor 1 and, due to a force effect on a top second foot-application area, the brake pedal 11 may be extended out of the swivel castor 1.

The pedal axle 15 is advantageously arranged centrally on the brake pedal 11, in particular centrally with respect to the actuating surface, in such a way that an actuation of the brake pedal 11 at the end facing in the direction of the pivot means 10 of the castor housing 3 moves the brake pedal 11 into the free-rolling position and an actuation of the brake pedal 11 at the end facing away from the pivot means 10 of the castor housing 3 moves the brake pedal 11 into the braking position.

The brake pedal 11 has, on the side facing a wheel 7, a respective brake shoe 14, which, in the braking position, exerts a braking force parallel to the wheel axle 5 directly on one side of the adjacent wheel 7.

The brake shoes 14 are, in particular, each formed on opposite lateral surfaces of the brake pedal 11, which face the wheels 7.

The brake pedal 11 is advantageously designed as a two-component injection molded part, wherein a first component forms a base body, with a fastening attachment 13 for fastening on the castor housing 3, and the actuating surface and a second component forms the brake shoes 14.

The base body of the brake pedal 11 advantageously forms a core projection 12, in particular made from PA material, which is preferably overmolded with TPU material for the brake shoes 14.

Figure 4:
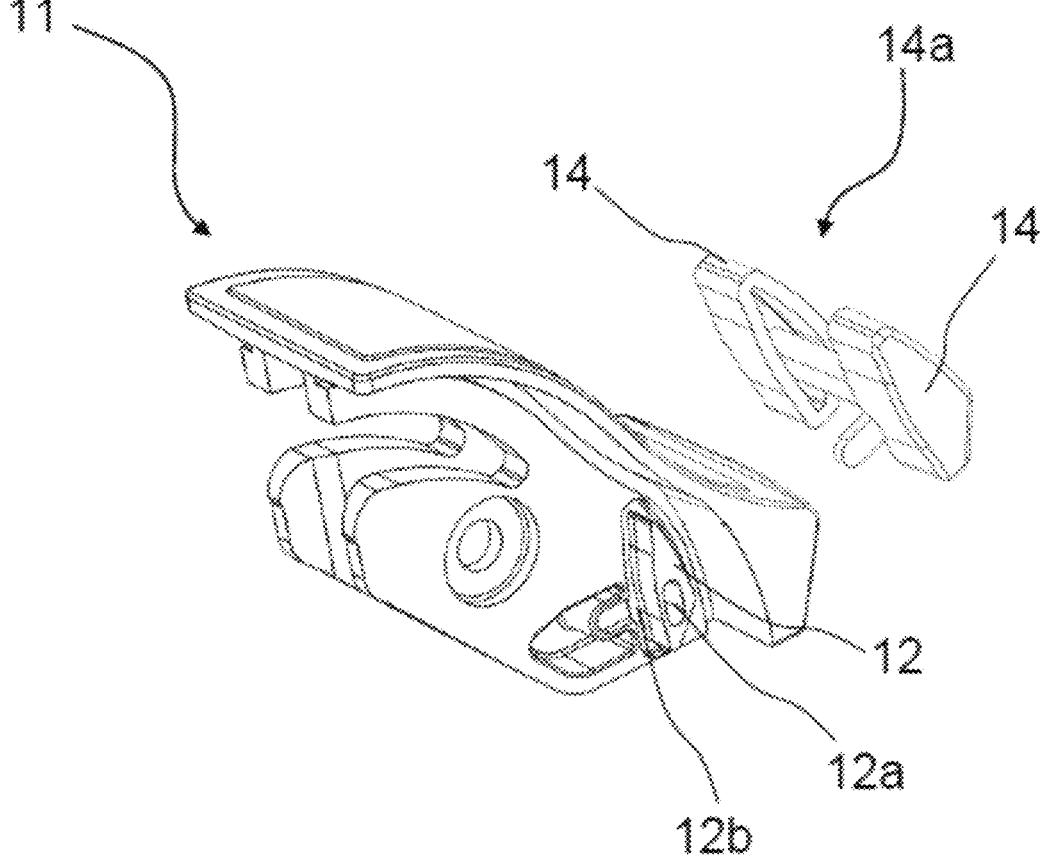
FIG. 4 shows a three-dimensional view of an embodiment of a brake pedal and an embodiment of brake shoes according to the teachings of the present disclosure.

FIG. 4 shows a three-dimensional view of an advantageous embodiment of the brake pedal 11 and the brake shoes 14 formed as an overmolded part 14*a* of the brake pedal 11. For better illustration, the overmolded part 14 is illustrated separately. The brake pedal 11 has the respective core projection 12 on its two lateral surfaces. An injection opening 12*a* is advantageously arranged in the core projections 12, which injection opening extends through the brake pedal 11 from an end face of one core projection 12 to the end face of the other core projection 12. A groove 12*b* is preferably formed around the core projections 12 in the lateral surface of the brake pedal 11. The core projections 12 are overmolded with the overmolded part 14*a*, which forms the brake shoes 14. The overmolded part 14*a* advantageously extends through the injection opening 12*a* and therefore connects the two brake shoes 14. The overmolded part 14*a* particularly advantageously engages in the groove 12*b*. A configuration of this type enables a very stable and durable configuration of the brake shoes 14.

Figure 5:
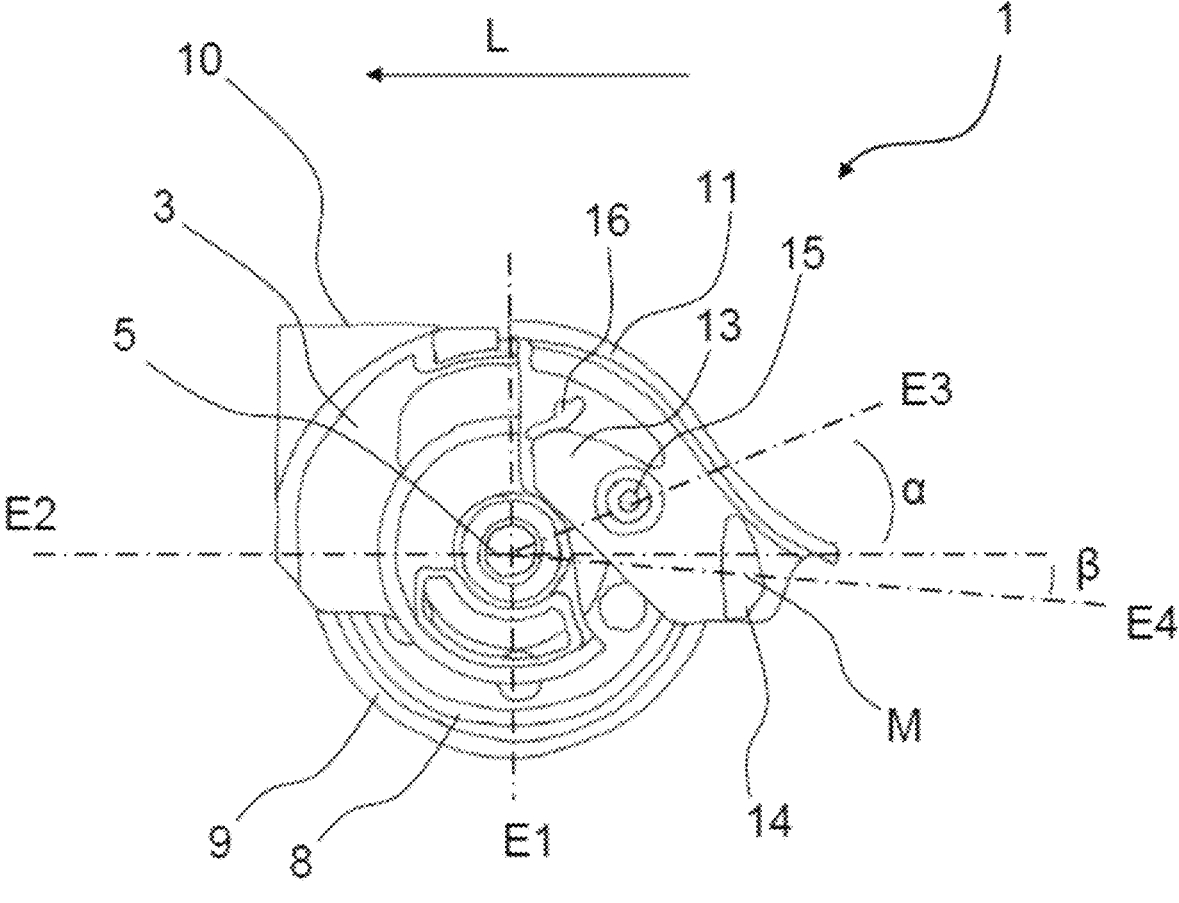
FIG. 5 shows a lateral inside view of the brakeable swivel castor according to FIG. 1, in which a wheel has been removed, in the free-rolling position.
Figure 6:
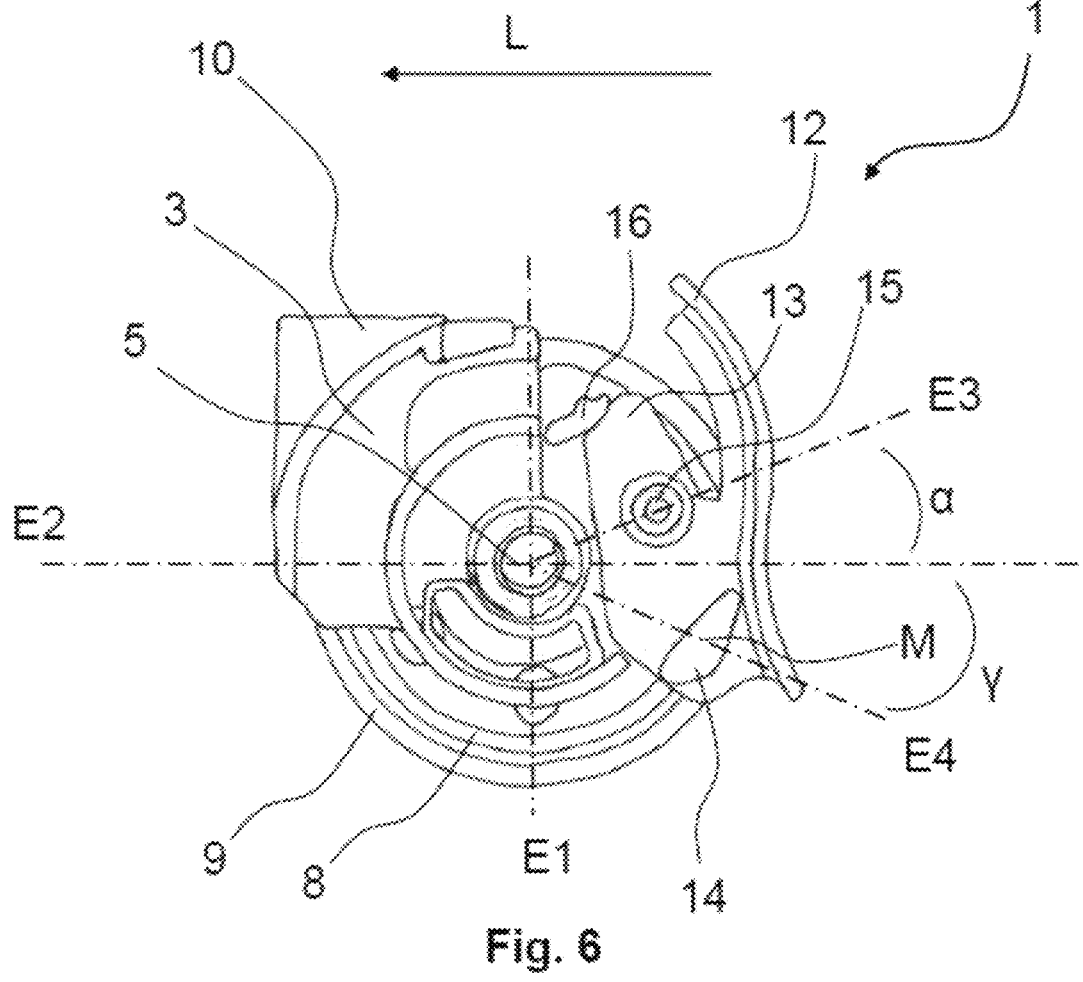
FIG. 6 shows a lateral inside view of the brakeable swivel castor according to FIG. 1, in which a wheel has been removed, in the braking position.

FIG. 5 shows a lateral inside view of the brakeable swivel castor 1 according to the present disclosure, with the brake pedal 11 in a free-rolling position. FIG. 6 shows the same inside view of the swivel castor 1, with the brake pedal 11 in a braking position. So that the positions of the brake pedal 11 can be seen more clearly, the front wheel 7, as seen in the viewing direction, has been removed from view in each case.

The pedal axle 15 is preferably arranged behind a vertical plane E1 extending through the wheel axle 5, as seen contrary to the rolling direction L. The pedal axle 15 is advantageously arranged above a horizontal plane E2 extending through the wheel axle 5. The pedal axle 15 is particularly preferably arranged circumferentially with respect to the wheels 7 in such a way that it is located in a plane E3 with the wheel axle 5, which plane encloses an angle $\alpha$ of a maximum of $-45°$ with the plane E2 extending horizontally through the wheel axle 5. In the illustrated embodiment, the angle $\alpha=20°$.

The brake shoes 14 are preferably arranged in such a way that their center points M, as seen in the circumferential direction of the wheel 7, are located behind the vertical plane E1 extending through the wheel axle 5, as seen contrary to the rolling direction L. In particular, the center points M of the brake shoes 14 are located behind the pedal axle 15, as seen in the rolling direction L.

In the free-rolling position according to FIG. 5, the brake shoes 14 of the brake pedal 11 are positioned radially outside the wheels 7. In particular, in the free-rolling position, the brake shoes 14 are positioned circumferentially with respect to the wheels 7 in such a way that they are located in a plane E4 with the wheel axle 5, which plane encloses an angle $\beta$ of a maximum of $+15°$ with the plane E2 extending horizontally through the wheel axle 5. In the illustrated embodiment, the angle $\beta=4°$.

In the braking position according to FIG. 6, the brake shoes 14 of the brake pedal 11 are clamped axially between the two wheels 7. To this end, the brake pedal 11, together with the brake shoes 14, have a thickness extending in the direction parallel to the wheel axle 5 which is greater than a lateral distance between the wheels 7 (see also FIG. 3).

In particular, in the braking position, the brake shoes 14 are positioned between the wheels 7 in such a way that their center points M, as seen in the circumferential direction of the wheels 7, are located below a horizontal plane E2 extending through the wheel axle 5. In the braking position, the brake shoes 14 are preferably positioned circumferentially between the wheels 7 in such a way that they are located in a plane E4 with the wheel axle 5, which plane encloses an angle γ of a maximum of +45° with the plane E2 extending horizontally through the wheel axle 5. In the illustrated embodiment, the angle γ=23°.

Figure 7:
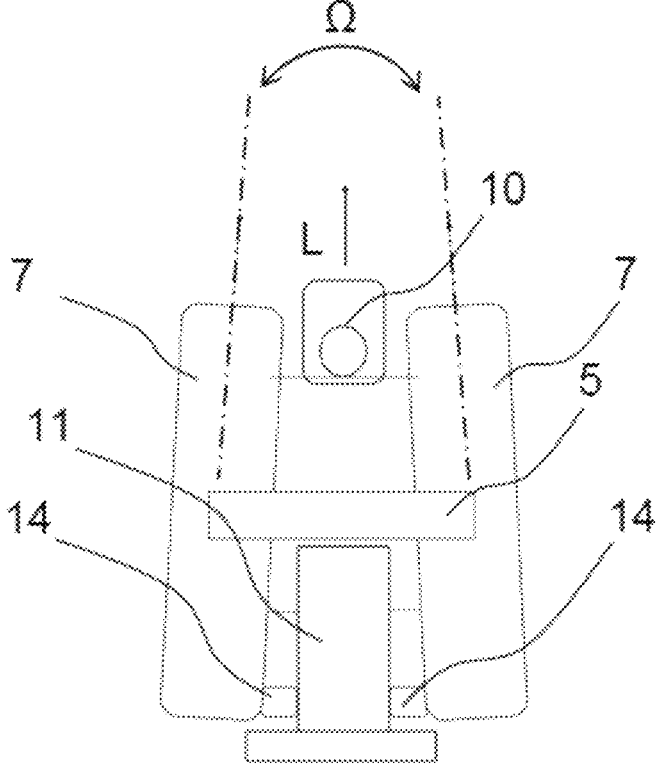
FIG. 7 shows a plan view from above, in sketch form, of a brakeable swivel castor according to the teachings of the present disclosure in the braking position.

FIG. 7 shows an illustration of a plan view from above, in sketch form, of an embodiment of the brakeable swivel castor according to the present disclosure in the braking position. In the braking position, the brake shoes 14 press the wheels 7 apart on the side facing contrary to the rolling direction L and press them indirectly together on the side facing in the rolling direction L, wherein the wheels 7 are positioned towards one another in the rolling direction L at an angle Ω of 1° to 4°, preferably 2° to 3°. In particular, this inclined position relative to the rolling direction L is set via tolerances in individual components of the swivel castor 1, preferably through the tolerances of the diameter of the wheel axle 5 and the wheel bearing 6 of the wheel 7 and/or the embodiment of the rivet connection of the wheel axle 5 and/or the oversize of the brake shoes 14.

As can be seen in FIG. 5 and FIG. 6, the brake pedal 11 is preferably held in the free-rolling position on the castor housing 3 with form fit and force fit via latching means. In particular, to this end, the castor housing 3 has at least one integrally formed latching projection 16. The latching projection 16 is arranged, preferably integrally formed, on at least one side of the castor housing 3 which faces a wheel 7. The castor housing 3 advantageously comprises a respective latching projection 16 on both sides. The latching projection 16 is designed, in particular, with an arcuate form such that, in the free-rolling position, it forms a form-fitting and force-fitting latching connection with an end face of a limb of the brake pedal 11. The latching projection 16 is preferably designed with a curved form in the direction of the limbs of the brake pedal 11. The brake shoes 14 are particularly advantageously made of a plastic material, in particular of TPU, whereof the Shore A hardness is greater, in particular up to 10 greater, preferably 5 greater, than the Shore A hardness of a plastic material, in particular of a TPU, of the wheels 7. The Shore A hardness here is determined according to DIN ISO 48-4:2021-02.

In this regard, in the braking position, a clamping action is preferably generated between the brake pedal 11 made of TPU and the tyres of the wheels 7, which tyres are made of TPU. The brake shoes 14 are advantageously designed to be smooth, i.e. without a profile, whereby a high surface pressure is generated. At the same time, tilting of the brake shoes 14 is hindered by the material of the tyres. Ideally, the TPU materials are selected with regard to the friction values such that it is possible for the wheels to spin in excess of a certain limit value of the movement force acting on the luggage item, without the brake pedal 11 being released from the braking position. In particular, this may prevent the luggage item from tipping under high movement forces, in particular due to inclined surfaces of greater than 38°.

In particular, the core projections 12 of the brake shoes 14 are advantageously made of a solid PA material harder than the brake shoes 14, whereby a spring effect and thus the possible appearance of resultant wear in the material of the brake shoes 14 is reduced or even avoided.

The invention is not restricted to the exemplary embodiments illustrated and described, but comprises all embodiments which have the same effect within the context of the present disclosure. It is expressively emphasised that the exemplary embodiments are not restricted to all features in combination; instead, each individual sub-feature may also have inventive significance in isolation from all other sub-features. Furthermore, the invention is hitherto not yet restricted to any specific feature combinations defined herein, but may also be defined by any other desired combination of certain features of all individual features disclosed overall. This means that, essentially, practically any individual feature may be omitted or replaced by at least one individual feature disclosed at another point in the application.

What is claimed is:

1. A brakeable swivel castor for cases, having a castor housing which can be pivoted into a rolling direction (L) via pivot means and two wheels rotatably mounted on the castor housing on a horizontal wheel axle,
   wherein the pivot means are arranged in front of the wheel axle, as seen contrary to the rolling direction (L), and having a braking device, which is designed to be movable between a braking position, in which the braking device exerts a braking force on at least one wheel, and a free-rolling position, in which the braking device releases the wheels,
   wherein the braking device has a brake pedal for generating the braking force, which is pivotably mounted on the castor housing via a pedal axle, which extends parallel to the wheel axle and is arranged between the wheels, and, in the free-rolling position and in the braking position, is held on the castor housing with form fit and force fit via latching means, and, said brake pedal in the braking position, at least one brake shoe arranged on the brake pedal exerts a braking force parallel to the wheel axle directly on one side of at least one wheel;
   wherein the pedal axle is arranged behind a vertical plane (E1) extending through the wheel axle, as seen contrary to the rolling direction (L);
   wherein the brake shoes are each formed on opposite lateral surfaces of the brake pedal, which face the wheels.

2. The brakeable swivel castor according to claim 1, wherein the pedal axle is arranged above a horizontal plane (E2) extending through the wheel axle.

3. The brakeable swivel castor according to claim 1, wherein the pedal axle is arranged circumferentially with respect to the wheels in such a way that it is located in a plane (E3) with the wheel axle, which plane encloses an angle (α) of a maximum of −45° with a horizontal plane (E2) extending through the wheel axle.

4. The brakeable swivel castor according to claim 1, wherein the brake shoes are arranged in such a way that their center points (M), as seen in the circumferential direction of the wheel, are located behind a vertical plane (E1) extending through the wheel axle, as seen contrary to the rolling direction (L).

5. The brakeable swivel castor according to claim 1, wherein in the braking position, the braking device presses the wheels apart on the side facing contrary to the rolling direction (L) and presses them indirectly together on the side facing in the rolling direction (L), wherein the wheels are positioned towards one another in the rolling direction (L) at an angle of 1° to 4°.

6. The brakeable swivel castor according to claim 5, wherein the wheels are positioned towards one another in the rolling direction (L) at the angle of 2° to 3°.

7. The brakeable swivel castor claim 1, wherein in the free-rolling position, the brake shoes are positioned circumferentially with respect to the wheels in such a way that they are located in a plane (E4) with the wheel axle, which plane encloses an angle (β) of a maximum of +15° with a horizontal plane (E2) extending through the wheel axle.

8. The brakeable swivel castor claim 1, wherein in the braking position, the brake shoes are positioned between the wheels in such a way that, in the braking position, their center points (M), as seen in the circumferential direction of the wheels, are located below a horizontal plane (E2) extending through the wheel axle.

9. The brakeable swivel castor claim 1, wherein in the braking position, the brake shoes are positioned between the wheels in such a way that they are located in a plane (E4) with the wheel axle, which plane encloses an angle (β) of a maximum of +45° with a horizontal plane (E2) extending through the wheel axle.

10. The brakeable swivel castor claim 1, wherein the pedal axle is arranged centrally on the brake pedal in such a way that an actuation of the brake pedal at the end facing in the direction of the pivot means moves the brake pedal into the free-rolling position and an actuation of the brake pedal at the end facing away from the pivot means moves the brake pedal into the braking position.

11. The brakeable swivel castor claim 1, wherein the brake pedal is designed as a two-component injection molded part, wherein a first component forms a fastening attachment for fastening on the castor housing and a second component forms the brake shoes.

12. The brakeable swivel castor claim 1, wherein the brake shoes are made of a plastic material whereof the Shore A hardness is greater than the Shore A hardness of a plastic material of the wheels.

13. The brakeable swivel castor according to claim 12, wherein the Shore A hardness of plastic material of the brake shoes is 5 to 10 greater than the Shore A hardness of the plastic material of the wheels.

14. The brakeable swivel castor according to claim 13, wherein the Shore A hardness of plastic material of the brake shoes is 5 greater than the Shore A hardness of the plastic material of the wheels.

15. The brakeable swivel castor claim 1, wherein the brake pedal, together with the brake shoes, have a thickness extending in the direction parallel to the wheel axle which is greater than a lateral distance between the wheels.

16. The brakeable swivel castor claim 1, wherein the brake pedal has a through-opening in the region of the brake shoes and the brake shoes are formed together as a single-part injection molded component with a material connection through the through-opening.

* * * * *